United States Patent
McFaul et al.

[11] 3,759,090
[45] Sept. 18, 1973

[54] ULTRASONIC EXTENSOMETER

[75] Inventors: Howard J. McFaul, Westminster; Donald C. Erdman; Evan B. Friedmann, both of Pasadena, all of Calif.

[73] Assignee: McDonnell Douglas Corporation, and Donald C. Erdman Co., a part interest to each

[22] Filed: Feb. 22, 1971

[21] Appl. No.: 117,635

[52] U.S. Cl. .................................. 73/67.6, 73/67.9
[51] Int. Cl. .............................................. G01n 29/00
[58] Field of Search .................. 73/67.7, 67.8, 67.9, 73/67.5, 67.6

[56] References Cited
UNITED STATES PATENTS

| | | | |
|---|---|---|---|
| 3,287,962 | 11/1966 | Relyea et al. | 73/67.9 |
| 3,599,478 | 8/1971 | Weinbaum | 73/67.7 |
| 3,307,393 | 3/1967 | Kessler | 73/67.1 |
| 3,485,087 | 12/1969 | Brech | 73/67.9 X |
| 3,550,435 | 12/1970 | Kaule | 73/67.9 X |
| 3,394,589 | 7/1968 | Tomioka | 73/67.9 X |

*Primary Examiner*—James J. Gill
*Attorney*—Walter J. Jason, Donald L. Royer and D. N. Jeu

[57] ABSTRACT

An ultrasonic extensometer for measuring the elongation of a bolt or the like being tightened against structure which it fastens, the extensometer including a transducer magnetically coupled to one end of the bolt, a pulser/receiver for generating a periodic pulse signal which energizes the transducer that is subsequently energized by the echo pulse from the far end of the bolt to provide an echo signal which is received and amplified, indicating circuit means for detecting and providing a correct couple indication between the transducer and its associated bolt end, and measuring circuit means for displaying a variable duration meter signal responsively produced by the amplified echo signal and controlled in duration by a vernier signal responsively produced by the pulse signal after a predetermined delay which is adjustable to index the vernier signal a desired amount with respect to the meter signal so that when the bolt has been elongated the proper amount, the amplified echo signal then coincides with the indexing vernier signal and the duration of the meter signal is reduced to zero.

20 Claims, 12 Drawing Figures

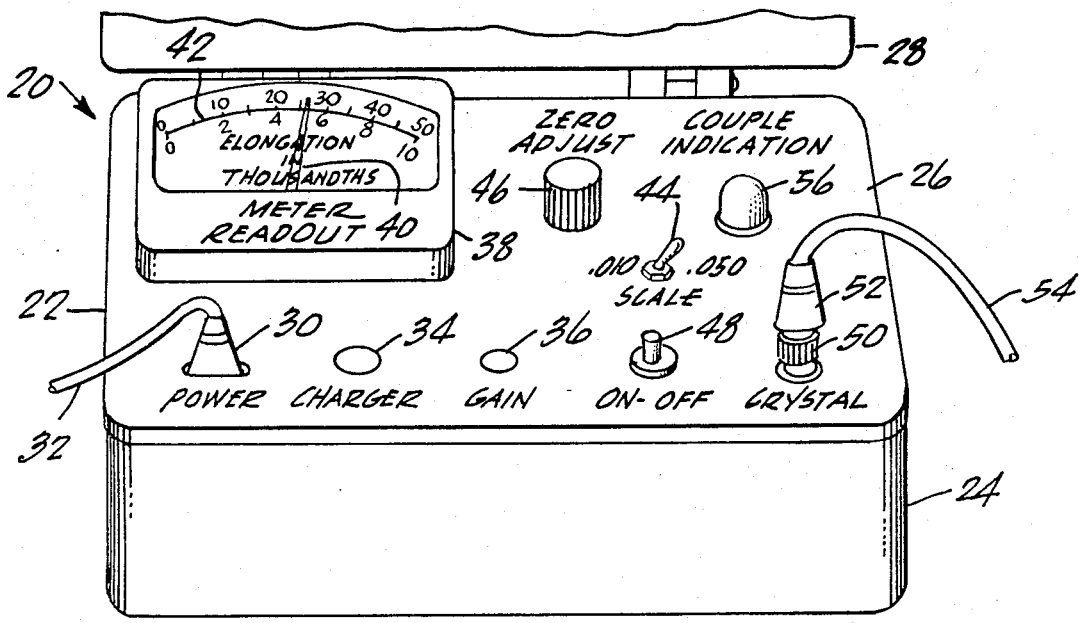
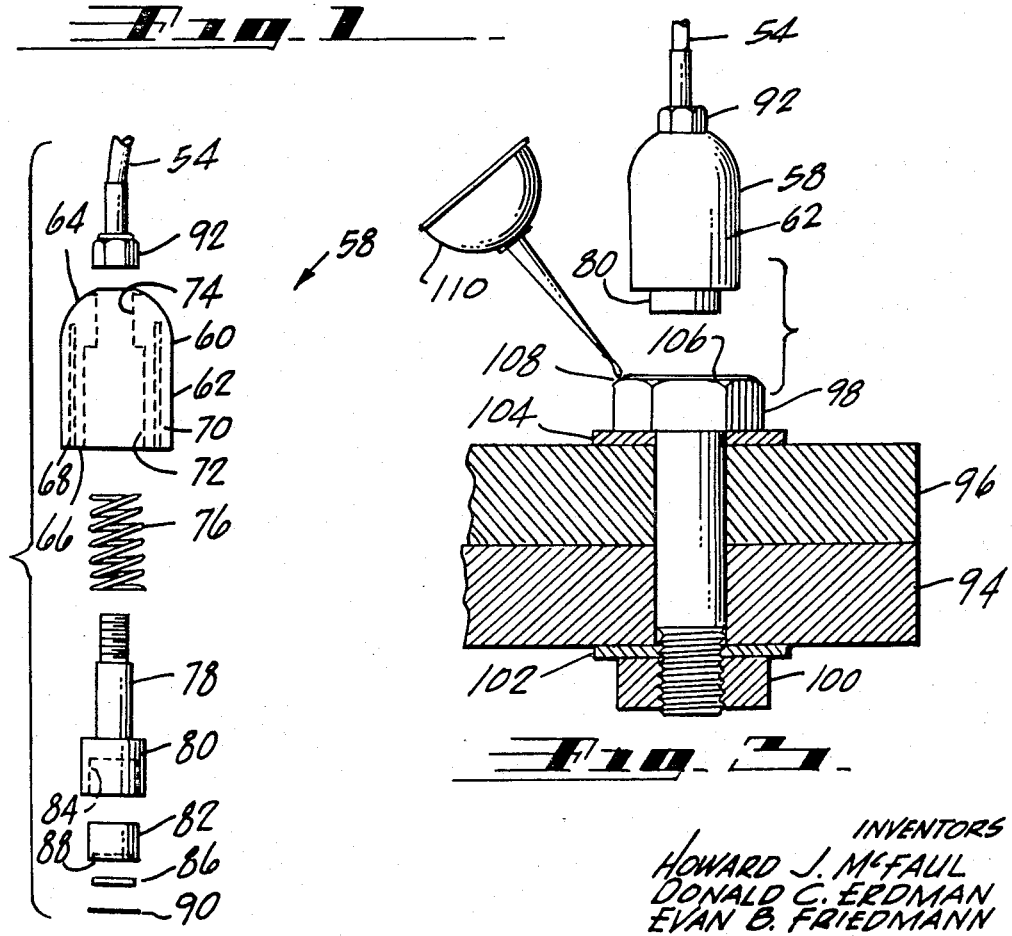

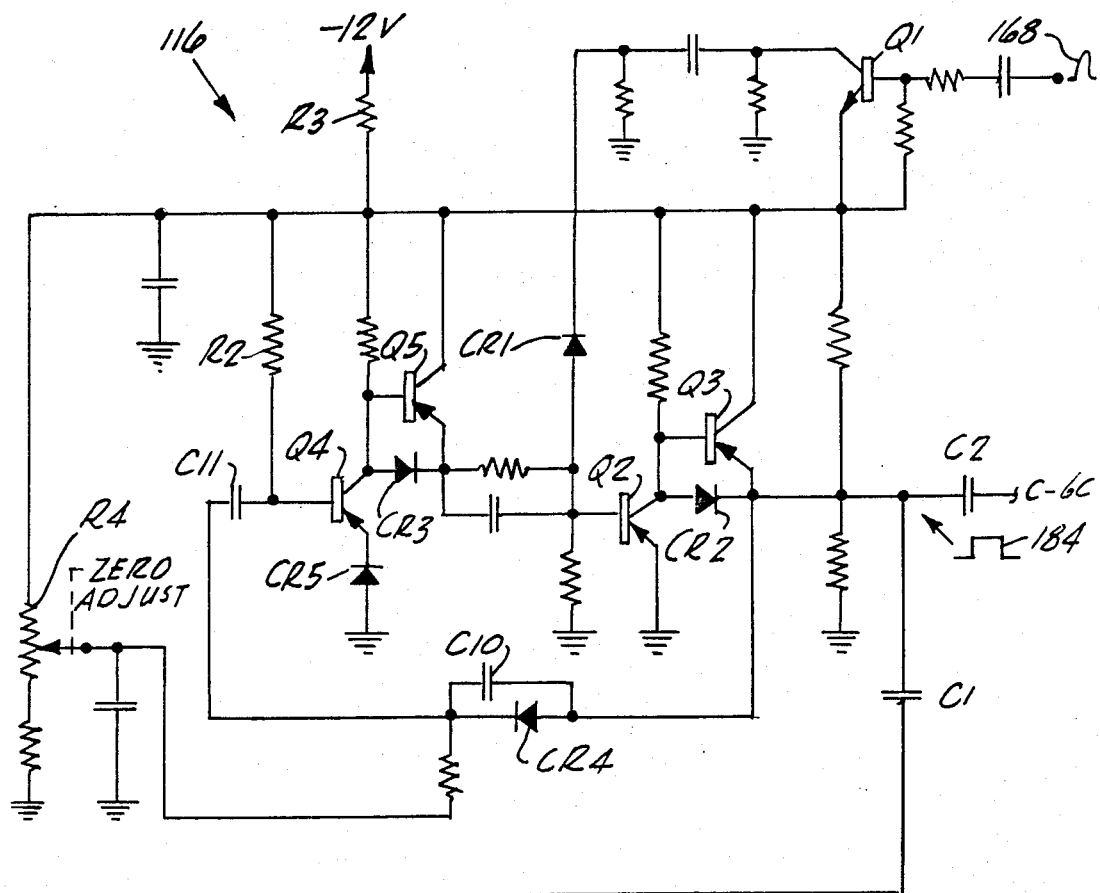
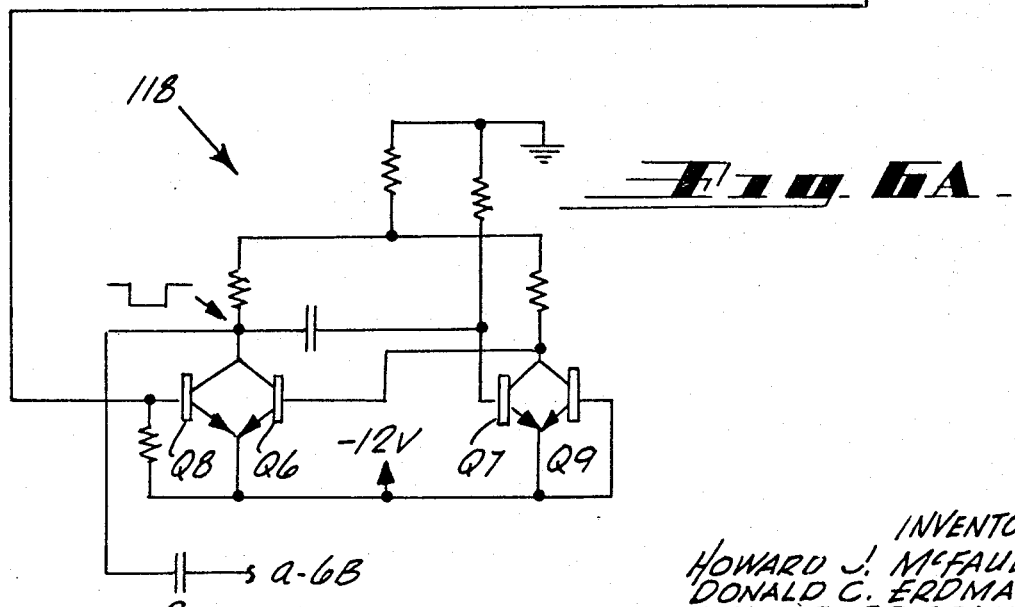

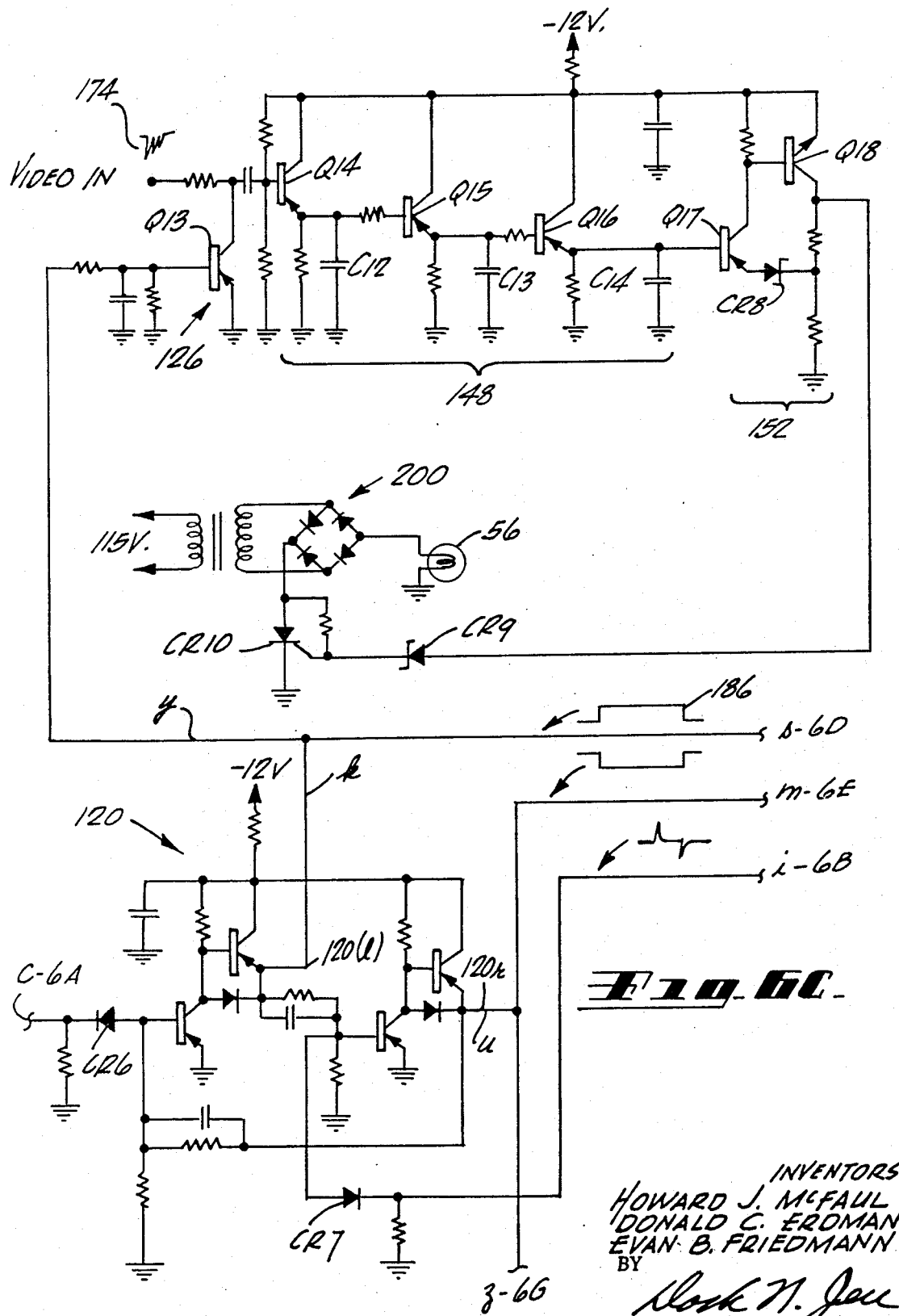

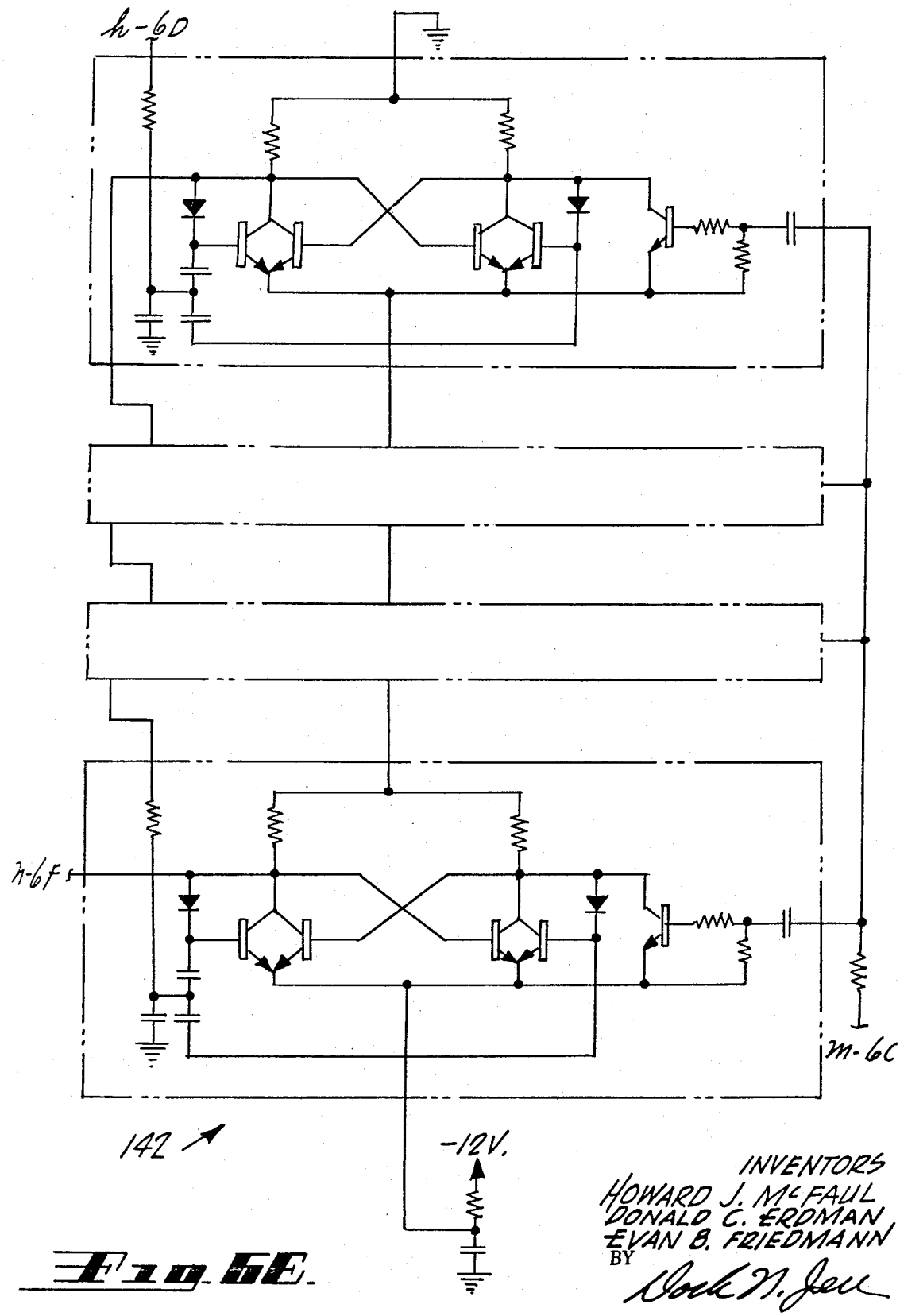

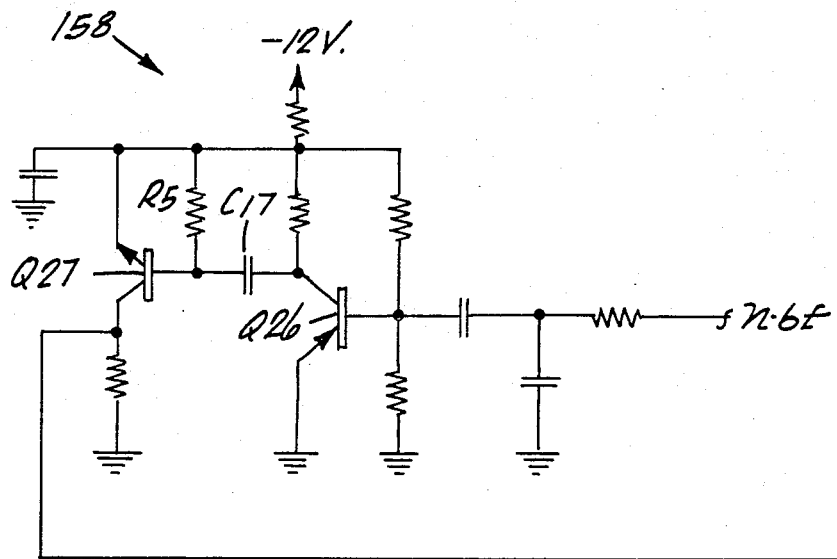
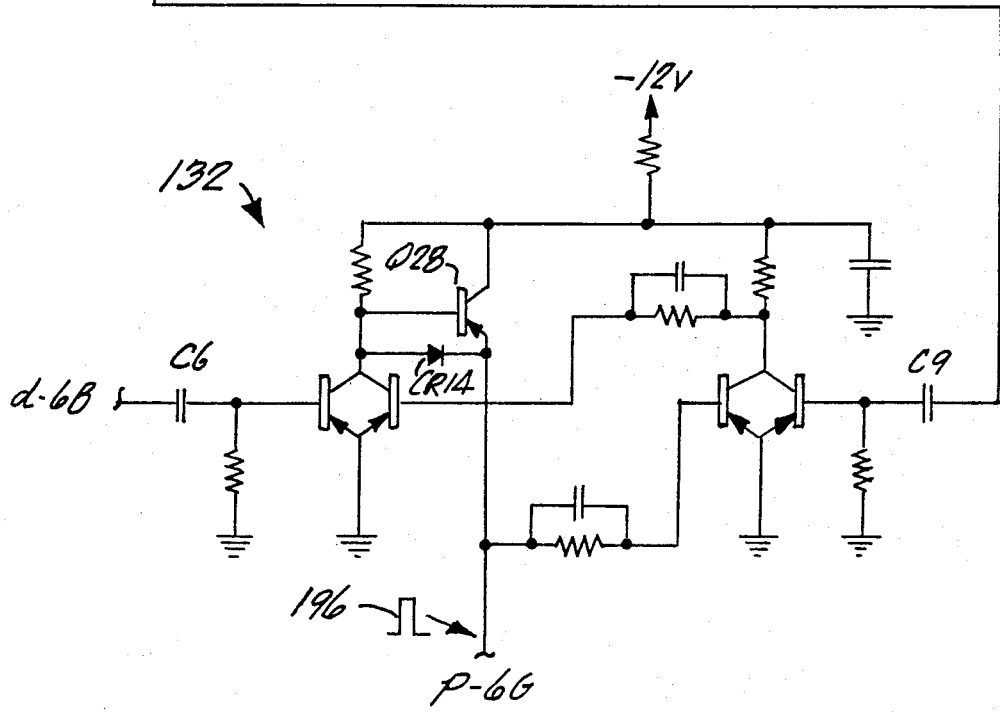
*Fig. 6F*
INVENTORS
HOWARD J. McFAUL
DONALD C. ERDMAN
EVAN B. FRIEDMANN
BY
- AGENT -

ULTRASONIC EXTENSOMETER

BACKGROUND OF THE INVENTION

Our present invention pertains generally to ultrasonic measuring devices. More particularly, the invention relates to a novel means and method of obtaining highly accurate measurements of the change in length occurring in, for example, a bolt or tie rod during tightening of its nut against the fastened structure.

As is well-known, the load on a bolt is commonly measured by using a torque wrench to tighten the bolt. Such measurements are, however, notoriously inaccurate because of the misleading effects of nut-to-bolt friction and/or nut-to-structure or washer friction. In order to avoid these effects, mechanical and ultrasonic (echo ranging) extensometers have been devised and utilized to measure the elongation of a loaded bolt directly rather than the torque being applied to it. The conventional ultrasonic extensometer is, of course, far more accurate than the mechanical one and can be an ordinary ultrasonic thickness measuring device or gauge suitably adapted to measure the length of a bolt. These conventional ultrasonic thickness gauges are, however, generally limited in accuracy to use in a narrow range of relatively short bolt lengths. Further, they cannot be easily operated using simple adjustments to achieve the extreme accuracy needed in measuring the actual bolt elongation. Coupling of the sonic transducer to the bolt in a properly operative and repeatable manner has also presented a problem.

For use in the manufacture of airframes and missiles, for example, a practical ultrasonic extensometer must measure changes in length to one part in 500 (0.2 percent accuracy), without any uncertain indications caused by rapid drifts or random noise fluctuations. The small size and easy interpretation of a meter is, of course, highly desirable and a meter displaying indications having 1 percent accuracy would be suitable, provided it displays indications limited to only the last 0.05 inch of, for example, a bolt being loaded (elongated). The problem in using a meter, however, is to select the particular 0.05 inch of a bolt's length to be measured when bolt lengths of 1 to 12 inches or more are commonly involved.

SUMMARY OF THE INVENTION

Briefly, and in general terms, our invention is preferably accomplished by providing an ultrasonic extensometer which utilizes a vernier means and method for accurately measuring only the actual increase in length or elongation of a loaded bolt, or the like, being tightened against structure which it fastens. Decreases in length or the actual shortening of a gradually unloaded bolt, for example, can also be measured by this extensometer.

The extensometer is preferably a compact and unitary instrument including a magnetic transducer assembly for magnetically coupling a piezoelectric crystal transducer to one end of the bolt through an oil or glycerine film to ensure good ulrasonic coupling therebetween, a conventional pulser/receiver for generating a periodic pulse signal which energizes the transducer that is subsequently again energized by the echo pulse from the far end of the bolt to provide an echo signal which is received and amplified, indicating circuit means for detecting and providing a correct couple indication between the transducer and its associated bolt end, and measuring circuit means for displaying a variable duration meter signal responsively produced by the amplified echo signal and controlled in duration by a vernier signal responsively produced by the pulse signal after a predetermined delay which is adjustable to index the vernier signal a desired amount with respect to the meter signal.

A meter with calibrated (elongation) scale and pointer can be used to display the variable duration meter signal after it has been preferably converted into a meter signal which is additionally variable in magnitude (peak amplitude) in proportion to its duration (i.e., after converting a rectangular waveform to a sawtooth one). The pointer provides a scale reading which corresponds to the magnitude (duration) of the converted meter signal as established by the controlling vernier signal. Suitable indexing of the vernier signal against the meter signal produces a meter reading (of desired bolt elongation) corresponding to the adjusted duration (subsequently converted into magnitude) of the meter signal. Since the meter signal is responsively produced by the amplified echo signal, when the bolt being loaded has been elongated the proper amount, the amplified echo signal then coincides with the indexing vernier signal such that the duration (and magnitude) of the meter signal is reduced to zero. Thus, the meter reading is progressively reduced from its adjusted reading of desired bolt elongation to a zero reading along with the gradual elongation of the bolt to the proper amount.

BRIEF DESCRIPTION OF THE DRAWINGS

Our invention will be more fully understood, and other features and advantages thereof will become apparent, from the description given below of an exemplary embodiment of the invention. The description of the exemplary embodiment of this invention is to be taken in conjunction with the accompanying drawings, in which:

FIG. 1 is a frontal view, perspectively shown, of an illustrative embodiment of an ultrasonic extensometer unit constructed according to our invention;

FIG. 2 is an exploded elevational view of an exemplary embodiment of a magentic transducer assembly which is used with the extensometer unit shown in FIG. 1;

FIG. 3 is an elevational view, partially in section, of the transducer assembly shown exploded in FIG. 2, two plates fragmentarily shown, and a bolt, nut and washers used to fasten the two plates together;

FIGS. 6A, 6B, 6C, 6D, 6E, 6F and 6G, together, comprise a circuit diagram showing an exemplary construction of the main portion of the ultrasonic extensometer illustrated in block diagram form in FIG. 4.

DESCRIPTION OF THE PRESENT EMBODIMENT

Figure 4:
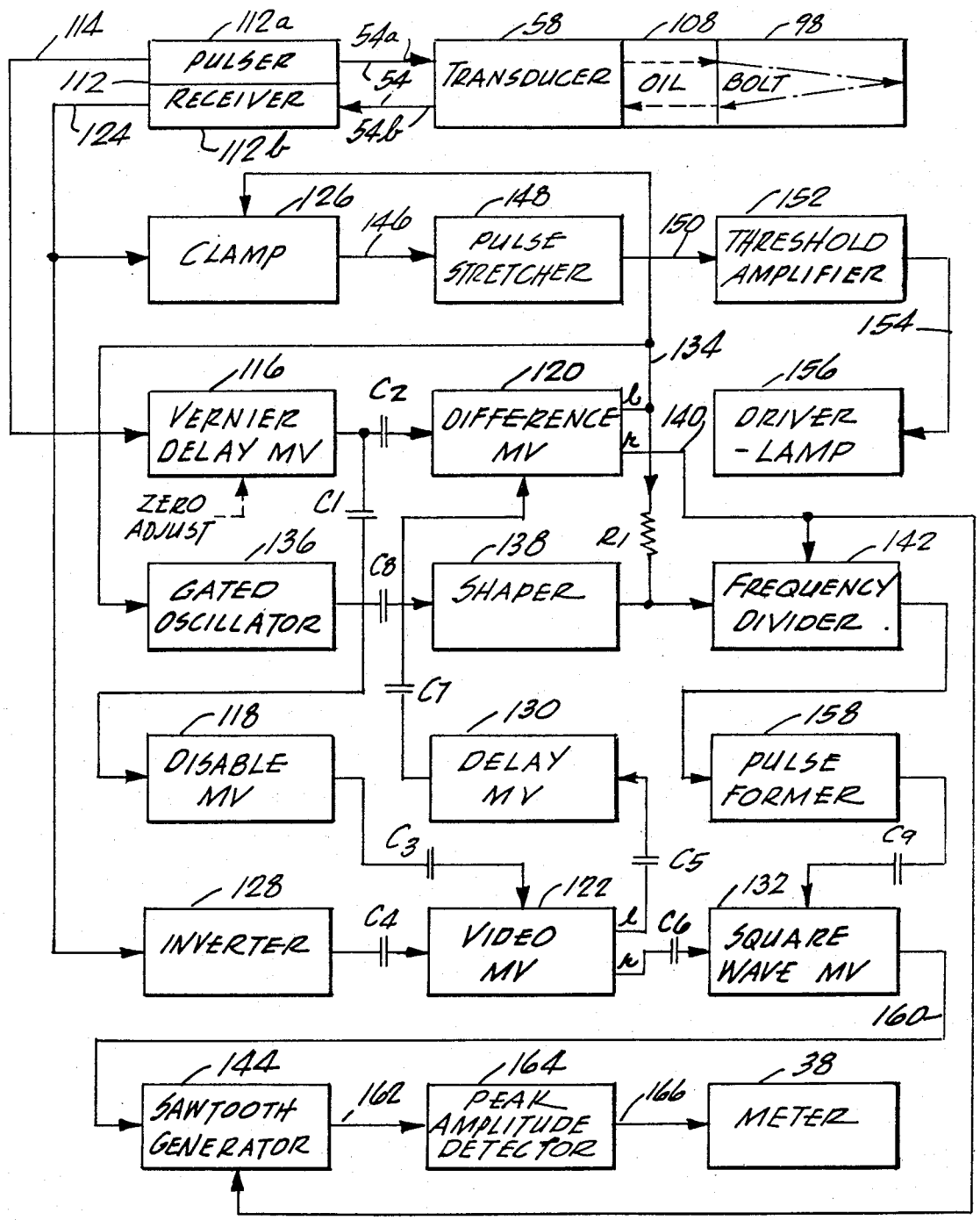
FIG. 4 is a block diagram of an illustrative embodiment of the ultrasonic extensometer used to measure the elongation of a bolt which is being progressively loaded.

FIG. 1 is a frontal view, perspectively shown, of an illustrative embodiment of a portable ultrasonic extensometer unit 20 constructed according to our invention. The unit 20 includes a small rectangular case 22 having a lower housing 24, a panel 26 closing the open upper end of the housing, and a relatively shallow upper cover 28 hinged to the rear wall of the housing for normally covering and protecting the elements mounted to the panel. The panel 26 mounts recessed power input pins which are engaged by the receptacle plug 30 at the end of cable 32 carrying regular 110 volts, 60 c.p.s. power to the unit 20. This alternating voltage is suitably rectified and filtered by conventional rectifier and filter means (not shown) in the housing 24 to provide a direct voltage supply for the various components of the ultrasonic extensometer.

A rechargeable battery (not shown) can also be carried in the housing 24 and connected to power the extensometer unit 20 where regular power is unavailable. A normally covered access opening 34 is provided in the panel 26 for coupling the output connector of a charger to the terminals of the battery mounted in the housing 24. Another normally covered access opening 36 is located next to the charger access opening 34 and allows the insertion of a screw driver to adjust the gain of the extensometer by conventionally varying, for example, the load resistance of the output amplifier which drives a bridge circuit including meter 38.

The meter 38 is mounted on the panel 26, and its pointer 40 indicates against a scale 42 which is linearly divided and calibrated into two ranges of (bolt) elongation. The pointer 40 provides a meter readout with the radially inner calibrations of scale 42 in a range of 0 to 10 thousandths of an inch, and with the radially outer calibrations of the scale in another range of 0 to 50 thousandths of an inch. The selection of either of these ranges on the scale 42 can be made by switch 44 which is also mounted on the panel 26. The range of 0.010 inch is obtained by moving the lever arm of switch 44 to the left from its right position which selects the range of 0.050 inch.

A zero adjust knob 46 mounted on the panel 26 is used to move the pointer 40 and set its position at a desired point along the scale 42. With the selection of the 0.050 inch range as indicated in FIG. 1, for example, the knob 46 can be suitably rotated until the pointer 40 is aligned with the 40 thousandths of an inch mark. By loading or increasing the load on the bolt being measured, the pointer 40 then moves towards zero proportionately with the elongation of the bolt. Thus, in this illustrative embodiment of the invention, when the pointer 40 indicates zero, the bolt has been elongated 0.040 inch.

The initial setting of the pointer 40 on the scale 42 at the exemplary 40 thousandths of an inch mark is an arbitrary zero reference setting. If an elongation of 0.030 inch were desired, the bolt can be loaded until the pointer 40 moves a marking spacing of 0.030 inch to the left of the initial zero reference setting of 0.040 inch, the bolt loading being stopped when the pointer is aligned with the 0.010 inch mark on the 0.050 inch range scale. For greater convenience and simplicity of operation, however, it is preferable to adjust the pointer 40 to a 0.030 inch initial or zero reference setting on scale 42 so that the pointer can be brought to a zero reading when the bolt has been elongated 0.030 inch. This, of course, would preclude the possibility of making any arithmetical errors in determining the required end reading for any particular bolt elongation desired. Note that in this instance the total amount of shortening of the loaded bolt due to a relaxation or reduction of its load, up to the initial zero reference scale setting, is indicated by the pointer 40 against the appropriate range scale.

A power on-off switch 48 mounted on panel 26 can be operated to connect or disconnect the direct voltage supply to the various components of the extensometer unit 20. The switch 48 preferable houses an indicator lamp (not shown) which is connected across the supply lines and energized when the switch is turned on. A pulser/receiver input receptacle 50 is located to the right of the switch 48 on the panel 26, and connector 52 at the end of coaxial cable 54 is normally connected to the receptacle. The cable 54 connects electrically with the faces of a piezoelectric crystal carried in a magnetic transducer assembly at the other end of the cable and which assembly is normally coupled magnetically to one end of a bolt that is to be loaded (elongated). A couple indication lamp 56 on the panel 26 indicates when a correct coupling is obtained or exists between the piezoelectric crystal transducer and the one end of the bolt by becoming or being de-energized. In the absence of a good sonic coupling between the crystal transducer and bolt end, the lamp 56 is energized and lighted in this illustrative embodiment of the invention.

FIG. 2 is an exploded elevational view of an exemplary embodiment of a magnetic transducer assembly 58 which can be used with the extensometer unit 20 of FIG. 1. The transducer assembly 58 includes a ring magnet 60 having a generally cylindrical body 62 with a hemispherical dome 64. The cylindrical body 62 is generally separated into radially inner and outer layers 66 and 68 by a cylindrical isolation sleeve 70. The body 62 can be fabricated of Alnico 5 magnet material and the sleeve 70 can be made of brass, for example. It can be seen that the sleeve 70 extends upward from the lower surface of the body 62 to near the surface of dome 64. The lower portion of the body 62 has a cylindrical central passageway 72 which is axially aligned with a similar but smaller diameter passageway 74 in the body's upper portion.

The transducer assembly 58 further includes a helically coiled spring 76, a coaxial terminal member 78, a transducer mount 80 affixed to the lower end of the terminal member, an acoustical back-up block 82 normally installed in an end space 84 in the terminal member, a piezoelectric crystal 86 which is a disc-shaped wafer element normally mounted in a suitably recessed space 88 in the back-up block, and a cover sheet 90 cemented to the lower end of the back-up block and the lower face of the crystal. The lower and upper faces of the crystal 86 are silver plated with respective electrical connections soldered thereto. The crystal 86 is suitably mounted to the back-up block 82 and its electrical connections are connected by respective leads (not shown) to the two conductor terminal elements of the coaxial terminal member 78. One of the electrical connections to the crystal 86 can, of course, be a ground (direct metal structure) connection. The block 82 is made of a dense metal which attenuates and damps sound in the direction opposite to the open end (lower crystal face) thereof. The cover sheet 90 protects the lower (silver plated) face of the crystal 86 and can be made of aluminum oxide, for example.

The spring 76 is normally contained in the passageway 72 of the ring magnet 60 and is positioned around the body of the coaxial terminal member 78. The upper end portion of the body of terminal member 78 extends through the passageway 74 of the upper member 64 and its threaded end is engaged by a connector 92 at the lower end of coaxial cable 54. The lower end of the spring 76 engages the upper edge (shoulder) surface of the transducer mount 80, and the upper end of the spring engages the upper end (shoulder) surface of the passageway 72. When the cable connector 92 is firmly fastened to the threaded end of the coaxial terminal member 78, proper electrical contact is made between the coaxial cable 54 and the crystal 86 through the terminal member. At the same time, the spring 76 is slightly compressed within the passageway 72 and biases the connector 92 against the top surface of the dome 64. In this condition, the lower end portion of the transducer mount 80 protrudes a short distance below the lower surface of the generally cylindrical body 62.

FIG. 3 is an elevational view, partially in section, of the transducer assembly 58 shown exploded in FIG. 2, two plates 94 and 96, and a bolt 98, nut 100 and washers 102 and 104 used to fasten the two plates together. In order to obtain a good sonic coupling between the transducer assembly 58 and the upper end surface 106 of the bolt 98, a film 108 of liquid which is preferably oil or glycerine is provided from a supply 110 on the bolt's upper surface before the transducer assembly is placed in contact therewith. The ring magnet 60 (FIG. 2) secures the transducer assembly 58 to the bolt's upper surface 106. The magnetic force against the transducer mount 80 compresses the spring 76 further, until the lower surface of the transducer mount becomes generally flush with the lower surface of the magnet body 62. The magnetically induced and spring controlled pressure-contact produced through the liquid (oil) film 108 between the lower surface of the transducer mount 80 and the bolt's upper surface 106 establishes the film's thickness which is usually of the order of about 0.001 inch.

The bolt 98 can, of course, be loaded without disturbing a good sonic coupling by tightening the nut 100. The ring magnet 60 used, however, produces a sufficiently strong and uniformly tight coupling with the upper surface 106 of the bolt 98 such that any ordinary movements of the bolt cannot disrupt or break the satisfactory sonic connection. While the oil film 108 produces and ensures good ultrasonic coupling between the transducer assembly 58 and the bolt 98, it is in this thin film that spurious ringing occurs. The powerful pulse signal which energizes the transducer (crystal) 86 and is subsequently followed by an echo signal from the far end of bolt 98 produces some spurious ringing due to reverberation between the lower surface of transducer assembly 58 (lower face of the crystal 86) and the near end (upper surface) of the bolt. This ringing persists briefly after the pulse signal and is, of course, also included in the echo signal. The measuring circuit means provided in the ultrasonic extensometer 20 is such as to preclude any erroneous or improper response to the spurious ringing portion of the pulse (or echo) signal.

FIG. 4 is a block diagram of the ultrasonic extensometer 20 (FIG. 1) and transducer assembly 58 (FIG. 3) as used to measure elongation of bolt 98 which is to be progressively loaded. The transducer assembly 58 is diagrammatically shown coupled to the near end of bolt 98 though oil film 108. A pulser/receiver 112 provides the powerful periodic pulse signal commonly called the "main bang" from pulser 112a on lead 54a to energize the piezoelectric crystal 86 of the transducer assembly 58. The crystal 86 is, of course, activated to produce an ultrasonic pulse signal which is coupled by oil film 108 to bolt 98, travels down the length of the bolt 98 and is reflected at the far end of the bolt back up its length. This ultrasonic echo signal then passes through the coupling oil film 108 to actuate the crystal 86 again and produce an electrical echo signal which is carried on lead 54b to the receiver 112b of the pulser/receiver 112.

Leads 54a and 54b are schematically shown in FIG. 4 and in actuality comprise the single coaxial cable 54 (FIGS. 1 and 3). The pulser/receiver 112 is a conventional and well-known item wherein the cable 54 is electronically switched by a transmit-receive means between the output of the pulser 112a and the input of the receiver 112b. The pulser/receiver 112 is, of course, commercially available and is preferably a Model 412-1 Pulser/Receiver manufactured by the Donald C. Erdman Company, Inc. of Pasadena, California.

The periodic pulse signal of the pulser 112a is also applied through lead 114 to trigger a very fast acting and stable monostable miltivibrator 116 having a variable triggered (set) period. The multivibrator 116 is automatically reset after triggering at a time proportional to the setting of meter 38 (FIG. 1) as set by the zero adjust knob 46. The length of this set period determines the delay of the start of a vernier signal which is generated following reset of the multivibrator 116. This multivibrator 116 is thus the vernier signal delay control multivibrator, or simply the vernier delay multivibrator. At the instants that the vernier delay multivibrator 116 is triggered and when reset, its output provides trigger signals through coupling (differentiating) capacitors C1 and C2 to another monostable multivibrator 118 and a bistable multivibrator 120, respectively. These multivibrators 118 and 120 have been reset at this time and their circuits are such that when the vernier delay multivibrator 116 is triggered, only the multivibrator 118 is triggered (set) at that time whereas when the vernier delay multivibrator is reset, only the multivibrator 120 is affected (triggered to the set condition) at that time.

The monostable multivibrator 118 has a triggered (set) period of, for example, about 5 microseconds. When the multivibrator 118 is triggered, its output is applied to another monostable multivibrator 122 through coupling capacitor C3. This assures that the multivibrator 122 is in the set condition by setting it if it is not. When the multivibrator 118 is reset after about 5 microseconds, its output triggers the multivibrator 122 to the reset condition. The electrical echo signal 122 with its spurious ringing is amplified by the receiver 112b and this video signal is applied on lead 124 to clamp means 126 and an inverter 128. The inverter 128 provides a positive video (echo) signal through coupling capacitor C4 to the multivibrator 122. This video multivibrator 122 is not affected by the positive video signal during the time (about 5 microseconds) the disable multivibrator 118 had it set; however, the video multivibrator is triggered by the positive video signal after it was reset, to produce output signals through coupling capacitors C5 and C6 to a delay multivibrator 130 and square wave multivibrator 132, respectively. Since the video multivibrator 122 is effectively disabled for a predetermined initial period, any part of the periodic pulse signal or its spurious ringing portion picked up by the receiver 112b during such initial period is prevented from affecting the operation of the ultrasonic extensometer 20. While the video multivibrator 122 is a monostable device, it is normally operated in a bistable manner in the period concerned.

When the vernier delay multivibrator 116 is reset, the multivibrator 120 is triggered by the trailing edge of the output of the vernier delay multivibrator. The video multivibrator 122 is triggered later by the positive video (echo) signal from the inverter 128 to produce an output signal which, in turn, triggers the monostable multivibrator 130. The multivibrator 130 is automatically reset after a delay of a few microseconds, for example, 5 microseconds. When this delay multivibrator 130 is reset, its output is coupled by capacitor C7 to reset the multivibrator 120. The circuit of the multivibrator 120 is such that it is only affected by the trailing edge of the output of the delay multivibrator 130. During the time interval between the setting and resetting of this difference multivibrator 120, an output signal is provided on lead 134 to clamp means 126, a gated oscillator 136 and to the output of shaper means 138 through resistor R1. During the same time interval, another output signal of the difference multivibrator 120 is provided on lead 140 to frequency divider 142 and sawtooth generator 144.

The clamp means 126 is unclamped by the output signal of the difference multivibrator 120 on lead 134 and, thus, permits the passage of the negative echo signals from the lead 124 onto lead 146 to pulse stretcher 148 which is essentially a peak amplitude detector. The output of the stretcher 148 is connected by lead 150 to threshold amplifier 152, and the output of the threshold amplifier is connected by lead 154 to control a driver-lamp means 156 which includes the couple indication lamp 56 (FIG. 1). Echo signals on the lead 124 are passed by clamp means 126 and their peak amplitude is detected by the stretcher 148. When proper coupling is provided between the transducer assembly 58 (crystal 86) and bolt 98, echo signals of sufficient amplitude are obtained which can pass the threshold setting of the amplifier 152 to energize it. This produces an output signal from the threshold amplifier 152 and applied to the driver-lamp means 156 to turn off the driver and remove power from the lamp 56. Thus, the lamp 56 is extinguished only when a correct and adequate coupling exists between the transducer assembly 58 and bolt 98. The output signal of the difference multivibrator 120 on lead 140 is applied to the frequency divider 142 to reset it and to sawtooth generator 144 to condition it for sawtooth waveform formation.

During the time interval that the difference multivibrator 120 is set, its output on lead 134 is connected to the input of gated oscillator 136 and to resistor R1 connecting with the output of shaper means 138. The oscillator 136 is turned on to produce stable sine wave oscillations which are coupled to the shaper means 138 through a capacitor C8. The shaper means 138 can be, for example, a limiting (linear) amplifier circuit which produces generally square waves from the sine wave oscillations. The output of the shaper means 138 is suitably conditioned by the output of the difference multivibrator 120 on resistor R1 and applied to the input of the frequency divider 142. The oscillator 136 and shaper means 138 have an output frequency of 16 megahertz and the frequency divider 142 includes four counter (divider) stages, for example. Thus, the frequency divider 142 has an output frequency of 1 megahertz wherein each cycle has a period of 1 microsecond in the illustrative embodiment of this invention.

The output signal of the frequency divider 142 is connected to pulse former 158 which produces a sharp (negative) spike from each cycle thereof. Since the oscillator 136 is on and produces output oscillations for the time interval that the difference multivibrator 120 is set, a series of marker spikes at 1 microsecond spacings is produced over such time interval. This is the vernier signal which begins following reset of the vernier delay multivibrator 116 and ends with the reset of the difference multivibrator 120 by the output of delay multivibrator 130. This group of equally spaced vernier spikes is controlled in its beginning after the occurrence of the initial (main bang) pulse signal by the delay (set) period of the vernier delay multivibrator 116 as established by its zero adjust setting. The ending of the group of spaced spikes is determined by the appearance of the inverted echo signal which triggers the video multivibrator 122 to a set condition so that its output causes reset of the difference multivibrator 120 after a delay of a few microseconds by the delay multivibrator 130. The vernier signal is fed through coupling capacitor C9 to reset the square wave multivibrator 132 after it is triggered (set) by the output of video multivibrator 122 applied through the capacitor C6. This is accomplished with the next succeeding vernier spike appearing after the square wave multivibrator 132 has been triggered to its set condition.

When the video multivibrator 122 is triggered by the inverted echo signal from inverter 128, an output signal is suitably coupled by capacity C6 to trigger the square wave multivibrator 132 to its set condition. The zero adjust setting of the vernier delay multivibrator 116 effectively positions the entire group of uniformly spaced vernier spikes relative to the occurrence of the echo signal (as established by the triggering of the video multivibrator 122 and, of course, the square wave multivibrator 132) such that the next succeeding vernier spike is positioned at the predetermined (desired) amount of spacing with respect thereto. This spacing or time interval between the occurrence of the echo signal and of the next succeeding vernier spike determines the duration of the square wave signal produced from the square wave multivibrator 132. The square wave signal is a rectangular waveform pulse signal provided on lead 160 to the sawtooth generator 144 which converts it to a sawtooth peak amplitude that is proportional to the width or duration of the rectangular signal. The output of the sawtooth generator 144 is connected by lead 162 to peak amplitude detector 164 which detects the peak amplitude of the sawtooth signal. The output of the detector 164 is connected by lead 166 to meter 38 which is energized so that its pointer 40 (FIG. 1) is deflected to a reading proportional to the detected peak amplitude of the sawtooth signal.

The rectangular waveform pulse signal of the square wave multivibrator 132 is variable in duration inversely with the elongaton of bolt 98 (being loaded) since the position of the echo signal approaches that of the next succeeding vernier spike with increasing elongation of the bolt. The duration of the rectangular signal thus decreases with bolt elongation so that it is converted into a sawtooth signal which decreases proportionately in peak amplitude. The decreasing peak amplitude of the sawtooth signal is detected and applied to meter 38 such that its pointer 40 moves correspondingly to zero, at which time the appearance (position) of the echo signal coincides with that of the next succeeding vernier spike. If the elongation of the bolt 98 is now reduced by gradually unloading the bolt, the echo signal moves away from (occurs earlier than) its coinciding vernier spike to increase the duration of the rectangular signal from the square wave multivibrator 132. This rectangular signal is converted into a sawtooth signal which increases proportionately in peak amplitude to increase the reading of meter 38 in accordance with the reduction of elongation of the bolt 98.

It is well-known that the velocity of sound varies in different media (materials) and with temperature. The ultrasonic extensometer 20 is adjusted and calibrated for use with high strength steel bolts installed in ordinary manufacturing plants at normal room temperature (68° F). The extensometer 20, however, provides correct indications to the limit of meter readability and resolution for all regular bolts made from any of the common metals or alloys therefor, and/or where the temperature can vary anywhere between the extremes for very hot summers and very cold winters. For bolts or structure made of an uncommon metal or other material, and/or where the temperature is exceptionally hot or cold, the vernier signal frequency can be suitably adjusted so that the spacing between the vernier spikes is such that movement of the pointer 40 (FIG. 1) along the graduations of scale 42 correctly reflects the conditions involved. This can be easily accomplished by adjusting the output frequency of the oscillator 136 to a frequency as determined from an appropriate calibration table or chart indexed according to materials and/or temperatures. It may be noted that the velocity of sound in an unstressed bolt is also changed when it is stressed. The high stress is, however, concentrated at the smallest (thread root) diameter near the far end of the bolt and, further, the change in velocity is negligible and imperceptible in the meter readings for any elongation (stress) measured with the extensometer 20.

Figure 5:
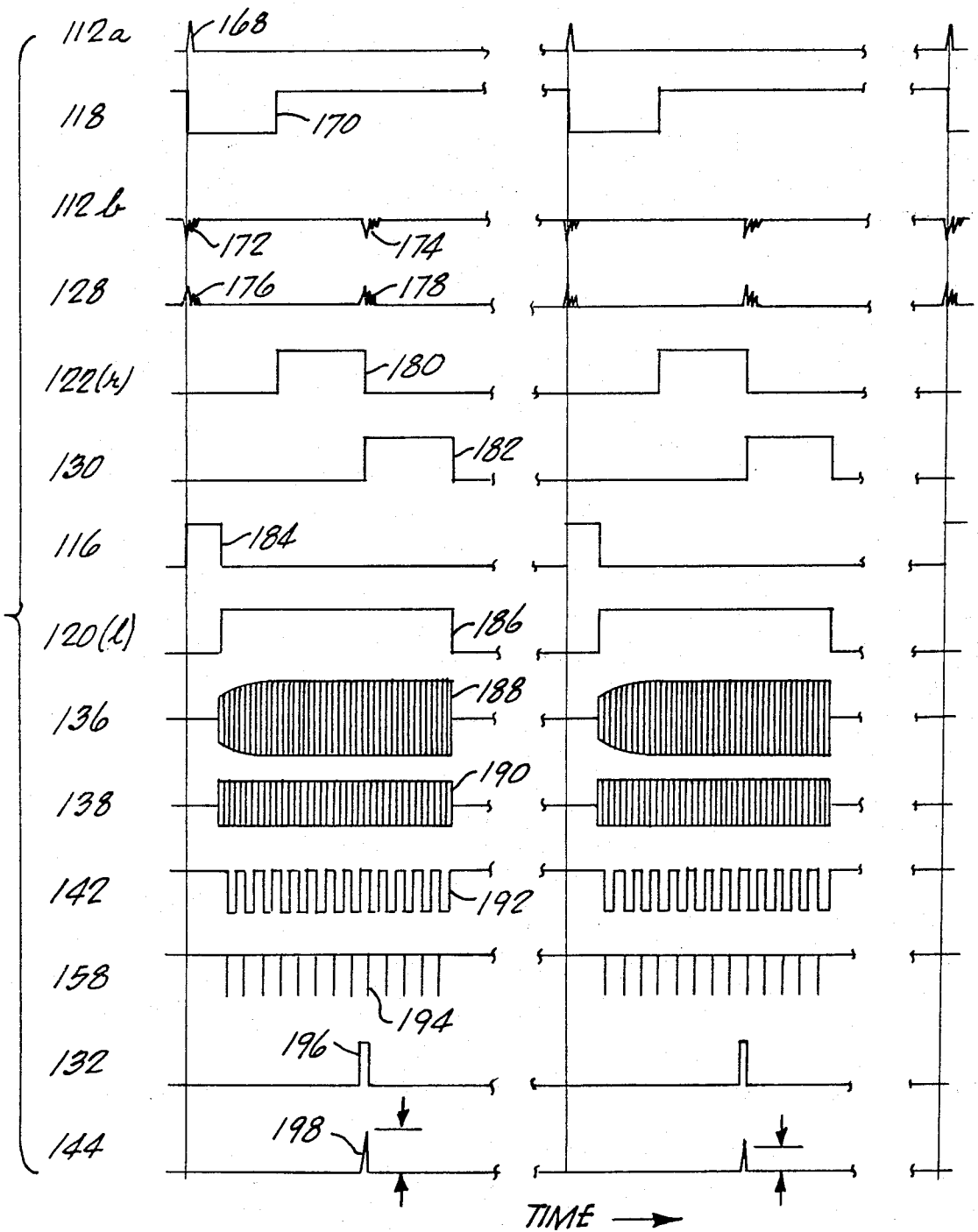
FIG. 5 is a graph showing a series of different waveforms of certain components of the block diagram of FIG. 4, to illustrate and help explain the operation of the ultrasonic extensometer in measuring the elongation of a bolt being loaded.

FIG. 5 is a graph showing a series of different voltage waveforms of the output signals of certain components in the block diagram of FIG. 4, to illustrate and help explain the operation of the ultrasonic extensometer 20 in measuring the elongation of bolt 98 which is being loaded. The different waveform plots are labeled with adjacent numerals which correspond to their respectively associated components. The output waveform for pulser 112a includes periodic pulses 168 which represent the main bang signals occurring at intervals of, for example, 1,000 microseconds. The next output waveform is that for disable multivibrator 118 and includes a negative (relative to its base line) pulse 170 which represents the set period beginning at the occurrence of the pulse 168. The output waveform of receiver 112b includes video signals 172 and 174. The signal 172 comprises an initial pulse picked up by the receiver 112b due to imperfect isolation of the main bang pulse 168 and additional pulses due to spurious ringing caused thereby. The signal 174 is the echo signal of the main bang pulse 168 and of its associated spurious ringing pulses. The output waveform of inverter 128 includes video signals 176 and 178 which are merely the results of inverting the signals 172 and 174, respectively.

When the disable multivibrator 118 resets, the rise at the trailing end of pulse 170 triggers the video multivibrator 122 to produce from its output 122(r) the start of a positive (relative to its base line) pulse 180. In referring to the pulse polarities of subsequent signals, such references are usually also with respect to their respective base lines. Of course, the signal from the video multivibrator output 122(1) includes a negative pulse corresponding with the positive pulse 180. The leading pulse of the inverted echo signal 178 resets the video multivibrator 122 and the resultant rise of the corresponding negative pulse triggers the delay multivibrator 130, producing the start of its positive output pulse 182. The output waveform of vernier delay multivibrator 116 includes positive pulse 184 having a leading edge produced with the triggering of the vernier delay multivibrator by the main band pulse 168. The duration of the pulse 184 is that established by the setting of pointer 40 (FIG. 1) against scale 42 as made manually with the zero adjust knob 46. The trailing edge of the pulse 184 triggers the difference multivibrator 120 and produces from its output 120(1), the start of its positive output pulse 186 which turns on the gated oscillator 136. The end of the pulse 186 is produced when the trailing edge of the output pulse 182 of delay multivibrator 130 resets the difference multivibrator 120. The gated oscillator 136 is, of course, turned off at such time.

The width or duration of the output pulse 186 of the difference multivibrator 120 determines the time interval that the gated oscillator 136 is turned on to produce the output waveform oscillation packet 188. The next output waveform plot is the square wave packet 190 produced by the shaper means 138 from the sine wave oscillations of packet 188. The frequency divider 142 produces an output waveform including the lower frequency square wave packet 192. The trailing edge of the packet 192 can be used, in this embodiment of the invention, to reset the divider 142 in preparation of the next cycle of operation. The pulse former 158 produces from the square waves of packet 192, the group of uniformly spaced vernier marker signals or spikes 194. When the video multivibrator 122 was reset by the inverted echo signal 178, the trailing edge of the pulse 180 from its output 122(r) triggers the square wave multivibrator 132 producing the start of its rectangular output pulse 196. The next succeeding vernier spike 194 resets the multivibrator 132 and establishes the width or duration of the pulse 196. Note that by adjusting the width or duration of the output pulse 184 of the vernier delay miltivibrator 116, the group of vernier spikes 194 can be laterally moved so that the position of the next succeeding vernier spike following the leading edge of the pulse 196 is varied with respect to such leading edge.

When the leading edge of the rectangular pulse 196 is positioned essentially in line with but imperceptibly ahead of a vernier spike 194, the pointer 40 (FIG. 1) is deflected to indicate the upper range limit of meter scale 42. In order to be able to position the pointer 40 anywhere along the meter scale 42, the trailing edge of the output pulse 184 of the vernier delay miltivibrator 116 must therefore be variable over a spacing equal to that between two successive vernier spikes 194. For greater ease of operation, however, the trailing edge of the pulse 184 is preferably variable over a spacing equal to two of the spaces between the vernier spikes 194. In the illustrative embodiment of this invention, the pulse 184 has a minimum pulse width of 0.5 microsecond and a maximum one of 2.5 microseconds, for example. The variable duration rectangular pulse 196 is converted into a sawtooth pulse 198 by sawtooth generator 144. The peak amplitude of the sawtooth pulse 198 is detected by peak amplitude detector 164 (FIG. 4) and governs the pointer indication of meter 38.

The right half of the waveform plots shown in FIG. 5 illustrates the changes occurring therein after the bolt 98 being loaded has been elongated an increment over its condition as illustrated in the left half of such plots. Since the bolt 98 is now longer, the inverted echo signal 178 arrives a little later than before so that the slower resetting of the video multivibrator 122 results in a later triggering of the square wave multivibrator 132. The vernier spikes 194 are, of course, still fixed in position whereby the next succeeding vernier spike 194 now produces a rectangular pulse 196 which is narrower in width than before. Conversion of such a narrower pulse 196 into a sawtooth pulse 198 produces one which is smaller in peak amplitude. Detection of this by the peak amplitude detector 164 produces a smaller indication on the meter 38. When the bolt 98 has been elongated the desired amount that was initially established by a proper zero adjust setting of the pointer 40 (FIG. 1) against its scale 42, the width of the rectangular pulse 196 and the peak amplitude of the sawtooth pulse 98 are reduced to zero, which also brings the pointer to a zero scale indication.

Figure 6B:
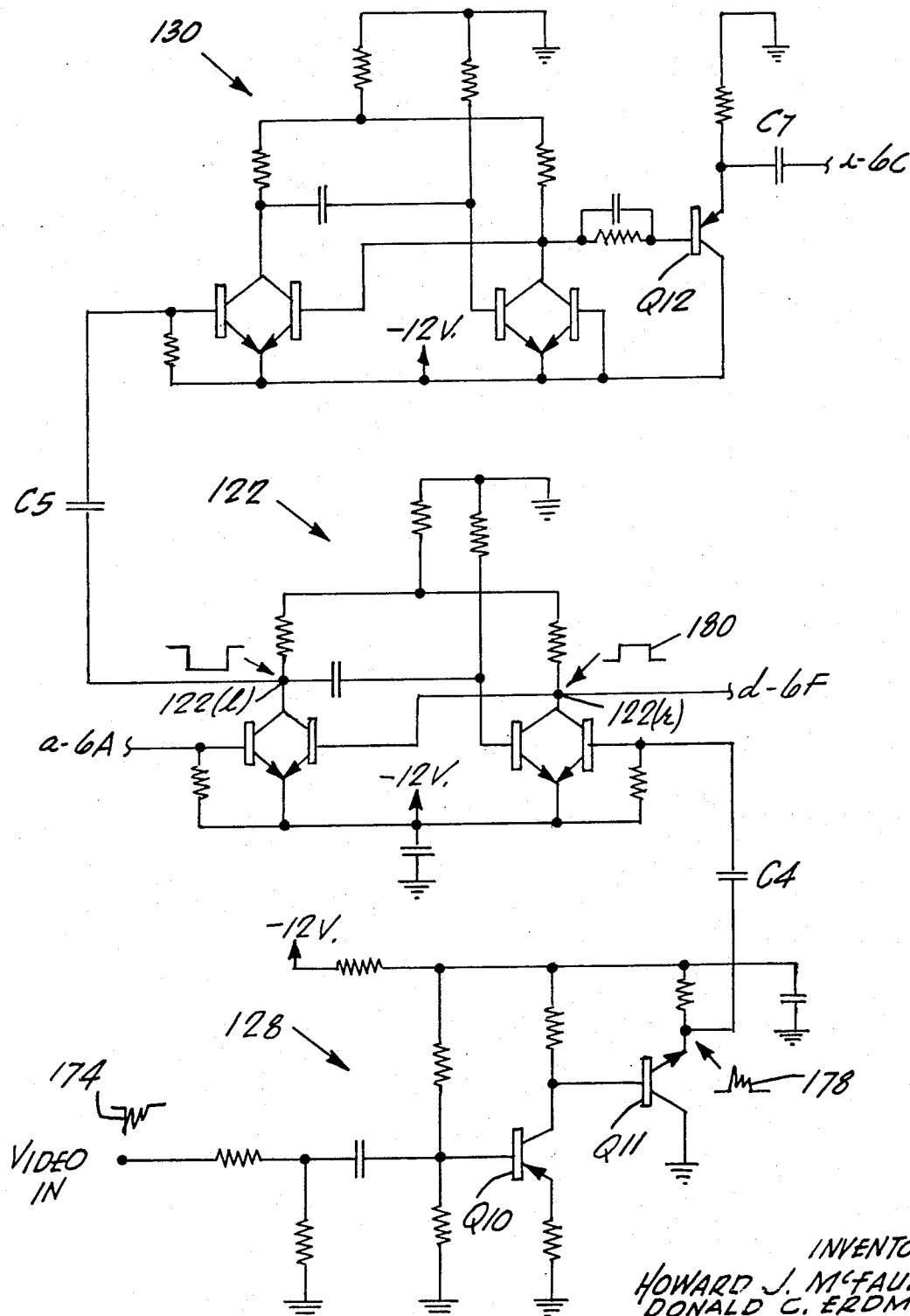

FIGS. 6A through 6G taken together comprise a circuit diagram showing an exemplary construction of the main portion of the ultrasonic extensometer 20 illustrated in block diagram form in FIG. 4. The ends of interconnecting leads have been identified by arbitrary letters followed by the figure number in which the other connecting end is located for convenience of viewing the several drawing figures. In FIG. 6A, for example, the lead end a-6B means that the other end of the lead a is located in FIG. 6B. In FIG. 6B, such other end is identified as a-6A, of course. This circuit diagram includes exemplary circuits of various components indicated in FIG. 4. Each exemplary circuit is merely illustrative of one form of its component and is not to be considered as limiting thereon since other suitable forms of each of the various components can be used. The component circuits are generally conventional and operationally well-known so that the ensuing description can be largely restricted to the control between them and their interacting effects. The coupling capacitors C1 through C9 and resistor R1 shown in FIG. 4 have been similarly identified in the circuit diagram.

In FIG. 6A, transistor Q1 and its associated input and output networks amplify and shape the main bang pulse 168 from receiver 112b to provide a sharp negative spike through diode CR1 to the base of transistor Q2 which, together with transistor Q3, comprises the right section of the vernier delay multivibrator 116. The left section of the multivibrator 116 includes similar transistors Q4 and Q5. The transistor Q3 is connected as an emitter follower and diode CR2 is connected from the collector of transistor Q2 to the emitter of transistor Q3. Similarly, the transistor Q5 is connected as an emitter follower and diode CR3 is connected from the collector of transistor Q4 to the emitter of transistor Q5. The diodes CR2 and CR3 are connected in a pull-up, pull-down arrangement which ensures that the timing of the multivibrator 116 is not a function of coupling capacity between portions of the multivibrator. The negative spike through diode CR1 triggers on the transistor Q2 and its rise in potential is applied through the diode CR2, a parallel network including a fast response diode CR4 and capacitor C10, and capacitor C11 to the base of the transistor Q4 turning it off. The transistor Q3 is, of course, turned off and the previously charged capacitor C11 discharges through resistors R2 and R3 until the transistor Q4 is subsequently turned on again. A diode CR5 is provided in the emitter circuit of transistor Q4 to protect it from over voltage and reverse current flow.

The output pulse 184 of the vernier delay multivibrator 116 has a duration or width which can be varied by the wiper setting of potentiometer R4. The wiper of potentiometer R4 is mechanically connected to the zero adjust knob 46 (FIG. 1) and can be varied in position by operating the knob. It can be seen from FIG. 6A that the more negative is the potentiometer R4 wiper bias setting, the greater is the discharge current of capacitor C11 and the shorter is the duration of the output pulse 184. The output pulse 184 is coupled by (differentiating) capacitor C1 to disable multivibrator 118 which has a fixed set period of, for example, about 5 microseconds. The disable multivibrator 118 can be a conventional direct-coupled form of monostable multivibrator including multivibrator transistors Q6 and Q7, and their respective control transistors Q8 and Q9, the latter control transistor not being used for control since such control is not needed. The leading edge of the output pulse 184 provides a sharp positive pulse which triggers the multivibrator 118 into its set condition. Once triggered, the multivibrator 118 produces its output pulse 170 to the coupling capacitor C3 and automatically resets after about 5 microseconds. The capacitor C3 output lead end in FIG. 6A is identified as a-6B. The output pulse 184 of the vernier delay multivibrator 116 is also connected to capacitor C2 having an output lead end c-6C.

The lead a from FIG. 6A is connected to the input of the left section of video multivibrator 122 shown in FIG. 6B. It is apparent that the multivibrator 122 is a conventional direct-coupled form of monostable multivibrator with both left and right inputs, and left and right outputs 122(1) and 122(r). The video multivibrator 122 is not affected by the leading edge of the negative output pulse 170 of the disable multivibrator 118 but is triggered by the rise of its trailing edge. Subsequently, the video echo signal 174 from the receiver 112b appears at the input of inverter 128. The inverter 128 is a conventional circuit including transistors Q10 and Q11, and produces the output signal 178 which is applied through capacitor C4 to the right input of the video multivibrator 122. This triggers or resets the multivibrator 122 and completes the pulse 180 on lead d-6F from the right video multivibrator output 122(r). The rise of the trailing edge of the corresponding pulse from the left output 122(1) triggers delay multivibrator 130 which is a conventional direct-coupled form of monostable multivibrator having its right output coupled to drive a transistor Q12. The output from the transistor Q12 is the pulse 182 which is applied through capacitor C7 to lead i-6C.

In FIG. 6C, the lead c from the output of the vernier delay multivibrator 116 (FIG. 6A) is connected to the left input of difference multivibrator 120, and the lead $i$ from the output of the delay multivibrator 130 is connected to the right input thereof. The circuitry of the difference multivibrator 120 is generally similar to that of the vernier delay multivibrator 116 and is essentially a conventional bistable multivibrator with left and right outputs 120(l) and 120(r). In addition, the left and right inputs include negatively oriented diodes CR6 and CR7, respectively. Thus, the trailing edge of the output pulse 184 from the vernier delay multivibrator 116 sets the difference multivibrator 120 and the trailing edge of the output pulse from the delay multivibrator 130 resets it. This, of course, produces the output pulse 186 on lead $k$ from the left output 120(l) of the difference multivibrator 120. A corresponding output pulse of opposite polarity is obtained on lead $u$ from the right output 120(r) of the multivibrator 120. The lead $k$ branches into two leads $s$ and $y$, and the lead $u$ branches into two leads $z$ and $m$, as illustrated in FIG. 6C. It can be seen that the leads $s$ and $y$ with $k, u, z, m, i, c$ are all related to the difference multivibrator 120.

The lead $y$ is connected to the input circuit of clamp means 126 which includes a transistor Q13 that normally clamps the input of pulse stretcher 148 to ground. When the difference multivibrator 120 is triggered (set), however, the positive pulse 186 appearing on lead $y$ is applied to the transistor Q13 to prevent it from conducting. This allows the video echo signal 174 to be applied to the pulse stretcher 148 which is essentially a peak amplitude detector including transistors Q14, Q15 and Q16 with their respective charging capacitors C12, C13 and C14 of increasing capacitance. The echo signal 174 is of sufficient amplitude when the transducer assembly 58 (FIG. 4) is correctly coupled to the near end of bolt 98 through the oil film 108, to cause the capacitor C14 to be charged to a negative potential such that a breakdown of zener diode CR8 occurs. The transistor Q18 then conducts and causes a breakdown of zener diode CR9 to apply a negative voltage on the anode of silicon controlled rectifier CR10. This cuts off the rectifier CR10 and breaks the circuit to the couple indication lamp 56, removing power of a full wave bridge rectifier 200 therefrom.

Figure 6D:
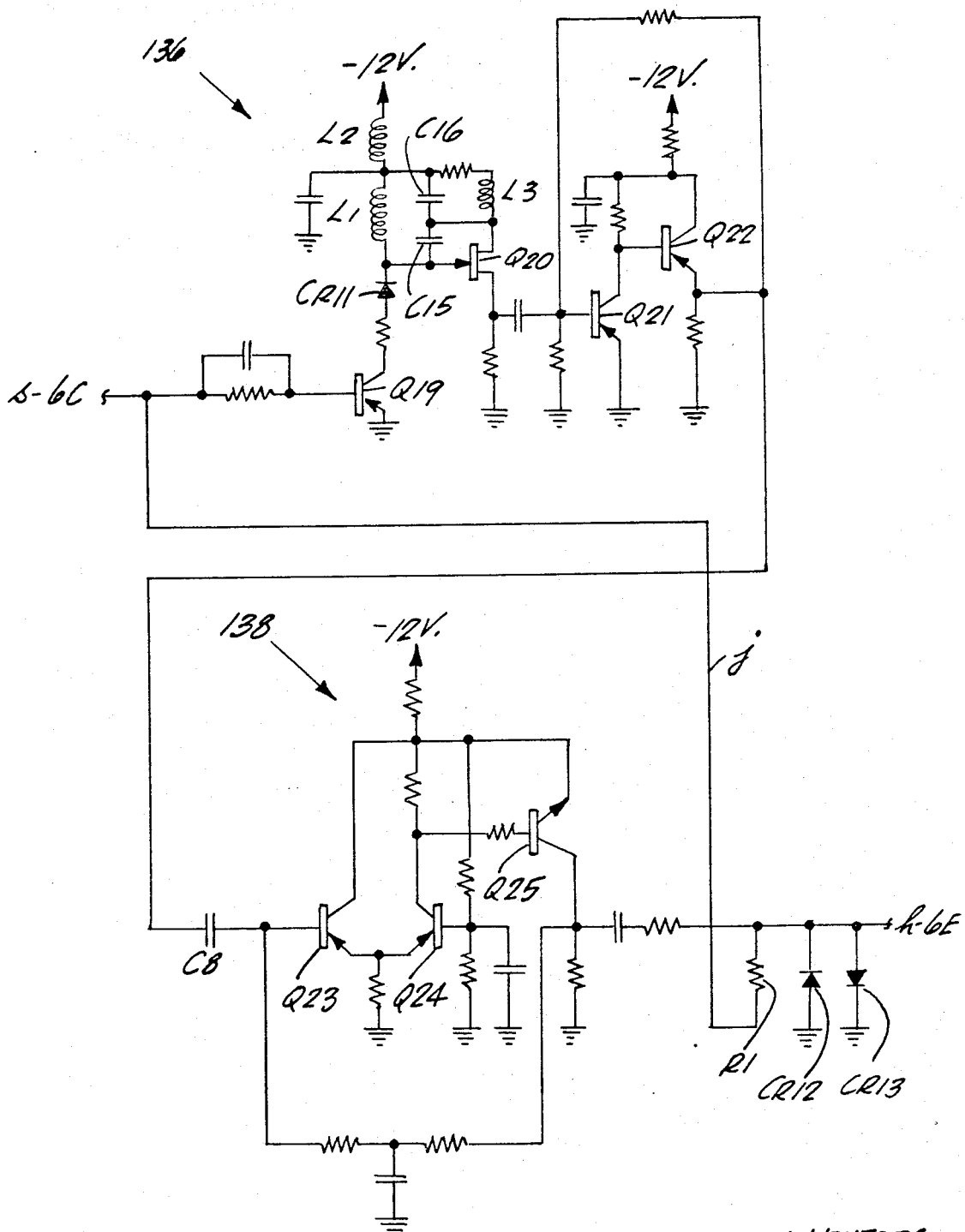
Figure 66:
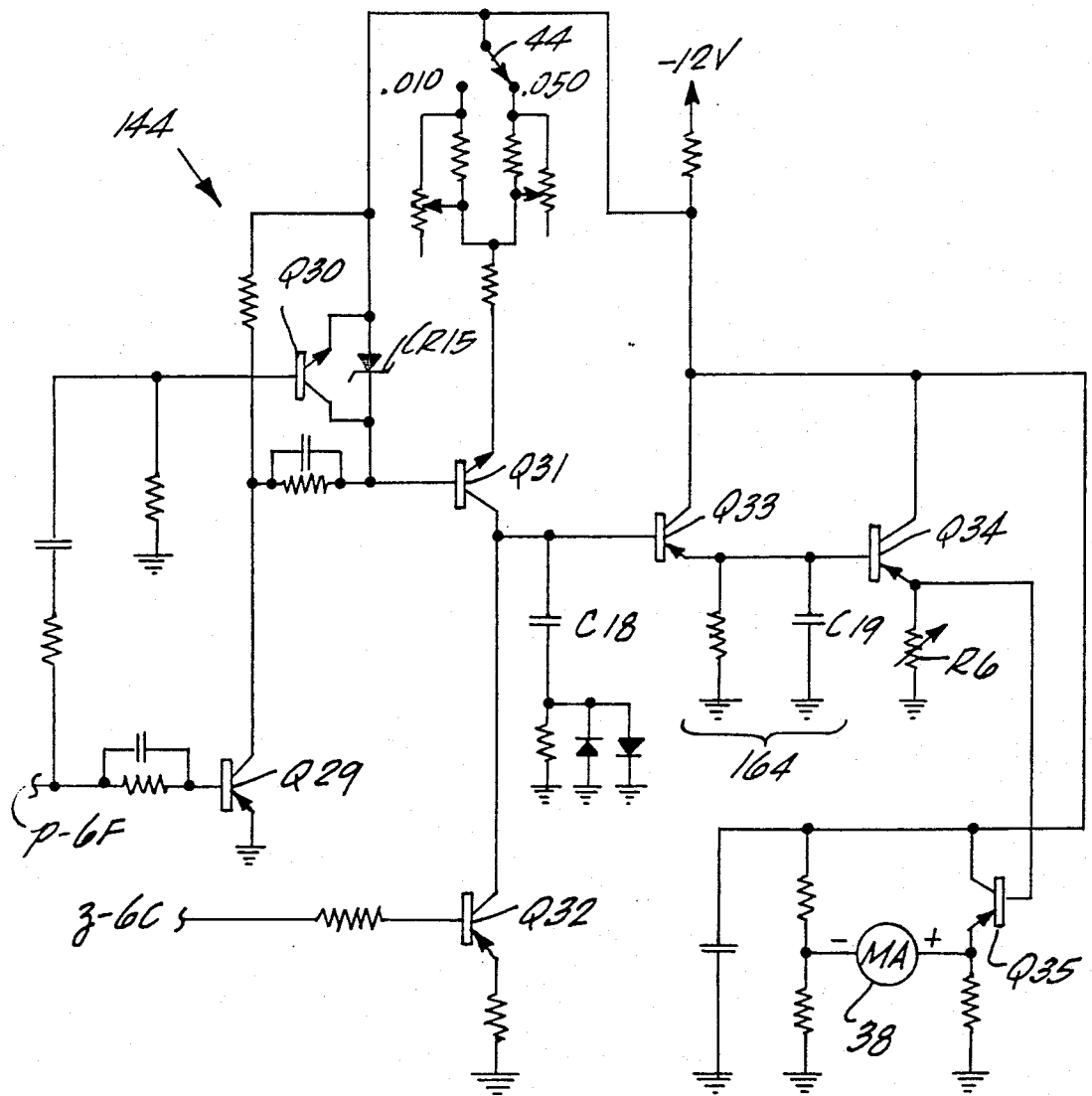

The positive pulse 186 from the left difference multivibrator output 120(l) is provided on lead $s$ to the gated oscillator 136 which is shown in FIG. 6D. This turns off clamp transistor Q19 to halt the current flow through diode CR11 to the tuned network of oscillator 136 and causes it to oscillate. The oscillator 136 is a transistor Colpitts-type oscillator circuit including a field effect transistor Q20 suitably connected to its tuned network comprising coil L1 in parallel with series capacitors C15 and C16. The voltage developed across the capacitor C15 is fed back between gate and source of the transistor Q20 in proper phase relationship for oscillation. Either one or both of the capacitors C15 and C16 can be adjusted to control the frequency and the amount of feedback voltage. Coils L2 and L3 are inductive choke elements, and the output of the oscillator 136 is coupled to an amplifier circuit including transistors Q21 and Q22. It is essential that this gated oscillator 136 have a large and stable first cycle response so that the pulse counting which occurs later in the extensometer system always counts from the first pulse. Before the clamp transistor Q19 is turned off, it causes a fairly large current flow through the oscillator coil L1 to establish a magnetic field of sufficient energy so that stable oscillations can begin immediately when the clamp transistor is turned off.

The immediately stable operating characteristics of the oscillator 136 can be improved or further attributed to the proper selection of the bias point on the field effect transistor Q20 such that the dynamic and static characteristics are identical. In addition, proper operation is obtained by use of a very high quality (high Q) inductive element to prevent shift of operating characteristics from the oscillating to the non-oscillating condition. The amplifier circuit including transistors Q21 and Q22 is for the purpose of isolating the oscillator 136 from its load which is the shaper means 138. This prevents load fluctuations from affecting the phase, amplitude or frequency of the oscillating means. The amplified output oscillations 188 (FIG. 5) of oscillator 136 are applied to the shaper means 138 through coupling capacitor C8. It can be seen that the shaper means 138 is a limiting amplifier including emitter-coupled transistors Q23 and Q24, and output transistor Q25. A degenerative feedback network is connected between the base and collector of the transistors Q23 and Q25 to eliminate the high frequency signal components. Lead $j$ connects the lower end of resistor R1 to lead $s$ so that the pulse 186 from the left difference multivibrator output 120(l) is applied thereto. The squared output signal of the limiting amplifier circuit 138 as appearing across the resistor R1 is then clamped by diodes CR12 and CR13 to provide the square wave signal packet 190 on lead end $h$-6E.

The square wave signal packet 190 (FIG. 5) on lead $h$ is provided to the conventional multiple stage counter or divider 142 shown in FIG. 6E. All (four) stages of the divider 136 can be reset by the trailing edge of the negative pulse from the right difference multivibrator output 120(r) appearing on the lead $m$. The reset control transistor of each divider stage responds to a positive rise or signal applied thereto. Before the divider stages are reset, however, a lower frequency square wave signal 192 is produced at the lead end $n$-6F. This signal 192 is suitably coupled to the pulse former 158 shown in FIG. 6F. The pulse former 158 can be of conventional circuitry including transistors Q26 and Q27 coupled by a suitable differentiating network comprising resistor R5 and capacitor C17. The transistors Q26 and Q27 are suitably energized at the negative drops or pulses of the square wave signal 192 to produce corresponding negative (vernier marker) spikes 194 (FIG. 5) which are coupled by capacitor C9 to the reset input of square wave multivibrator 132. It is apparent that the multivibrator 132 is essentially conventional, with a transistor Q28 and diode CR14 connected in one output-to-input coupling network. The trailing edge of the pulse 180 from the right video multivibrator output 122(r) on lead $d$ triggers (sets) the multivibrator 132 through capacitor C6 and the next succeeding negative spike 194 resets it through the capacitor C9. This produces a positive output pulse 196 at the lead end $p$-6G. The duration or width of the pulse 196 is variable inversely with elongation of the bolt 98 (FIG. 4) as was described earlier.

The positive rectangular pulse 196 on lead $p$ is applied to the base of transistor Q29 of the sawtooth generator 144 as shown in FIG. 6G. The lead $p$ is also connected through a coupling network to the base of bias transistor Q30 which conductively connects the base of control transistor Q31 to −12 volts. The collector of the transistor Q29 is suitably coupled to the base of the transistor Q31. The emitter of the transistor Q31 is connected to −12 volts through a calibrating resistor and scale range selector switch 44, and the collector is connected to the upper plate of charging capacitor C18 which has its lower plate suitably clamped as illustrated. The collector of the transistor Q31 is also connected to the collector of constant current transistor Q32, the base of which is suitably connected to the right difference multivibrator output 120(r) by lead z.

A zener diode CR15, shunting the transistor Q30, has its anode and cathode connected respectively to −12 volts and the base of transistor Q31. The diode CR15 breaks down only when sufficient reverse voltage exists across it. The upper plate of capacitor C18 is connected to the base input of peak amplitude detector 164 including a transistor Q33 and its associated charging capacitor C19. The output of detector 164 is applied to transistor Q34 having a gain adjustable load resistor R6. The output of transistor Q34 is applied to another transistor Q35 which is connected in one arm of a bridge circuit including the meter 38. As the conduction of transistor Q34 is decreased because of a decreased negative charge on capacitor C19, so is the conduction of the transistor Q35 decreased. This increases the resistance of the transistor Q35 and unbalances the meter bridge circuit such that an increased current flows through the meter 38 to deflect its pointer 40 (FIG. 1).

When the difference multivibrator 120 (FIG. 6C) is triggered by the trailing edge of the output pulse 184 of the vernier delay multivibrator 116, a negative pulse is applied on lead z to the base of the constant current transistor Q32 to turn it on. Before the positive rectangular pulse 196 appears on lead p, the transistors Q29 and Q31 conduct so that the capacitor C18 is charged negatively through the latter transistor. This establishes a reference or meter zero charge on the detector capacitor C19. Subsequently, when the rectangular pulse 196 appears on the lead p, the transistors Q29 and Q31 are turned off for its duration so that the capacitor C18 discharges through the transistor Q32 to produce a positive sawtooth pulse 198 having a peak amplitude proportional to the duration of the rectangular pulse. This is reflected in the capacitor C19 with the result that the transistors Q34 and Q35 conduct less and an increased current flows through the meter 38 according to the amplitude of the sawtooth pulse. Thus, in later cycles of operation, as the bolt 98 is elongated to its desired condition, the rectangular and sawtooth pulses 196 and 198 are progressively reduced to zero such that the meter 38 indication is similarly reduced.

The principles involved in the ultrasonic extensometer 20 system are clearly applicable to other uses in addition to the measurement of bolt elongation. Further, although the measurement of bolt elongation involves a sonic signal traveling in a folded path (wherein the echo signal is received at a substantially integral time multiple of twice its occurrence following the generation of the sonic signal), it is apparent that the principles of this invention are readily applicable to other than a sonic signal and to any type of signal traveling in an unfolded (wherein the received signal is measured at a substantially integral time multiple of unity times its occurrence following the generation of the signal) or variously bent path in any suitable media. Thus, while an exemplary embodiment of this invention has been described above and shown in the accompanying drawings, it is to be understood that such embodiment is merely illustrative of, and not restrictive on, the broad invention and that we do not desire to be limited in our invention to the details of construction or arrangement shown and described, for obvious modifications may occur to persons skilled in the art.

We claim:
1. A method of establishing the position of a movable target point in a medium with respect to an indexed position thereof, which comprises the steps of:
generating a reference signal at a reference point in said medium, said reference signal traveling at a generally established velocity along a path therein to said target point;
producing a target signal in response to the arrival of said reference signal at said target point;
generating a marker signal at a predetermined occurrence relative to that of said reference signal;
measuring a substantially integral time multiple of the occurrence of said target signal following the generation of said reference signal relative to that of said marker signal;
indicating the measured difference between the substantially integral time multiple of the occurrence of said target signal and that of said marker signal on indicating means, said indicating means being calibrated in units to correspond with units of movement of said target point; and
varying the occurrence of said marker signal relative to that of said reference signal so that a predetermined index indication is provided by said indicating means whereby the position of said target point when moved from its indexed position in said medium is correspondingly indicated by said indicating means with respect to said index indication thereof.

2. The invention as defined in claim 1 wherein a plurality of uniformly spaced marker signals is generated, the beginning of which is generated at a predetermined occurrence relative to that of said reference signal and the ending is at an occurrence after that of said target signal, the substantially integral time multiple of the occurrence of said target signal is measured relative to a selected one of said marker signals and the measured difference therebetween is indicated on said indicating means, and the beginning of said plurality of uniformly spaced marker signals is varied relative to that of said reference signal so that a predetermined index indication is provided by said indicating means.

3. The invention as defined in claim 2 wherein said plurality of uniformly spaced marker signals are originally generated independently of said reference signal, and said target signal is an echo signal of said reference signal reflected back towards said reference point from said target point and its occurrence on arrival proximate said reference point is measured relative to the occurrence of a selected one of said marker signals.

4. Means for establishing the position of a movable target point in a medium with respect to an indexed position thereof, said position establishing means comprising:
means for generating a reference signal at a reference point in said medium, said reference signal traveling at a generally established velocity along a path therein to said target point;

means for providing a target signal in response to the arrival of said reference signal at said target point;

means for generating a marker signal at a predetermined occurrence relative to that of said reference signal;

means for measuring a substantially integral time multiple of the occurrence of said target signal following the generation of said reference signal relative to that of said marker signal;

means for indicating the measured difference between the substantially integral time multiple of the occurrence of said target signal and that of said marker signal, said indicating means being calibrated in units to correspond with units of movement of said target point; and means for varying the occurrence of said marker signal relative to that of said reference signal so that a predetermined index indication is provided by said indicating means whereby the position of said target point when moved from its indexed position in said medium is correspondingly indicated by said indicating means with respect to said index indication thereof.

5. The invention as defined in claim 4 wherein said marker signal generating means generates a plurality of uniformly spaced marker signals, the beginning of which is generated at a predetermined occurrence relative to that of said reference signal and the ending is at an occurrence after that of said target signal, the substantially integral time multiple of the occurrence of said target signal is measured by said measuring means relative to a selected one of said marker signals and the measured difference therebetween is indicated on said indicating means, and the beginning of said plurality of uniformly spaced marker signals is varied by said varying means relative to that of said reference signal so that a predetermined index indication is provided by said indicating means.

6. The invention as defined in claim 5 wherein said plurality of uniformly spaced marker signals are originally generated independently of said reference signal, and said target signal providing means includes a reflecting surface of said target point and said target signal is an echo signal of said reference signal reflected therefrom back towards said reference point, and its occurrence on arrival proximate said reference point is measured by said measuring means relative to the occurrence of a selected one of said marker signals.

7. Ultrasonic means for measuring changes in length of a bolt or the like, said ultrasonic means comprising:

an electromechanical transducer coupled to one end of said bolt;

a pulser/receiver for generating a periodic electrical reference signal which energizes said transducer to send a sonic reference signal down the length of said bolt to produce a sonic echo signal from the other end of said bolt, said sonic echo signal subsequently energizing said transducer to provide an electrical echo signal which is received and amplified by said pulser/receiver;

means responsive to said electrical reference signal to generate an electrical marker signal at a predetermined occurrence relative to that of said electrical reference signal;

means for measuring the occurrence of said electrical echo signal relative to that of said electrical marker signal;

means for indicating the measured difference between the occurrences of said electrical echo and marker signals, said indicating means being calibrated in units to correspond with units of change in length of said bolt; and means for varying the occurrence of said electrical marker signal relative to that of said electrical reference signal so that a predetermined index indication is provided by said indicating means whereby changes in length of said bolt from its indexed length is correspondingly indicated by said indicating means with respect to said index indication thereof.

8. The invention as defined in claim 7 further comprising means for disabling said measuring means for a predetermined initial period whereby the spurious ringing portion of said electrical reference signal picked up by the receiver of said pulser/receiver during said initial period is prevented from affecting proper operation of said measuring means.

9. The invention as defined in claim 7 further comprising means for determining when a proper coupling of said transducer to the one end of said bolt is obtained.

10. The invention as defined in claim 9 wherein said proper coupling determining means includes means for sensing when said electrical echo signals are of at least a predetermined and sufficient magnitude which is obtainable with a proper coupling of said transducer to the one end of said bolt.

11. The invention as defined in claim 7 wherein said marker signal generating means generates a plurality of uniformly spaced electrical marker signals, the beginning of which is generated at a predetermined occurrence relative to that of said electrical reference signal and the ending is at a predetermined occurrence after that of said electrical echo signal, the occurrence of said electrical echo signal is measured by said measuring means relative to a selected one of said electrical marker signals, the measured difference between the occurrences of said electrical echo signal and the selected one of said electrical marker signals is indicated on said indicating means, and the beginning of said plurality of uniformly spaced electrical marker signals is varied by said varying means relative to that of said electrical reference signal so that a predetermined index indication is provided by said indicating means.

12. The invention as defined in claim 11 wherein said measuring means includes a square wave generating means responsive to the occurrence of said electrical echo signal to initiate a square wave output signal and responsive to the occurrence of a next succeeding electrical marker signal to terminate said square wave output signal, said square wave output signal being adapted to be applied to said indicating means whereby an indication representative of the measured difference between the occurrences of said electrical echo and marker signals is obtained.

13. The invention as defined in claim 11 wherein said varying means includes a vernier delay pulse generator responsive to said electrical reference signal to provide a pulse output signal of a predetermined duration, the end of said pulse output signal initiating generation of said plurality of electrical marker signals, and said vernier delay pulse generator being adjustable to vary the duration of said pulse output signal whereby the occurrence of the beginning of said plurality of electrical marker signals can be varied relative to that of said electrical reference signal.

14. The inventions as defined in claim 11 wherein said marker signal generating means includes a controlled oscillator means for providing a plurality of oscillation signal cycles, and pulse former means for forming pulses from said oscillation signal cycles as said electrical marker signals.

15. The invention as defined in claim 14 wherein said oscillator means can be adjusted to vary its frequency of oscillation whereby the uniform spacing of said electrical marker signals can be varied according to changes in sonic velocity to provide correct indication of said indicating means for its calibration.

16. The invention as defined in claim 14 wherein said marker signal generating means further includes a frequency divider means connecting said oscillator means to said pulse former means.

17. The invention as defined in claim 11 wherein said varying means can be adjusted to vary the occurrence of the beginning of said plurality of electrical marker signals over a duration at least equal to that between two successive electrical marker signals.

18. The invention as defined in claim 17 wherein said varying means can be adjusted to vary the occurrence of the beginning of said plurality of electrical marker signals over a duration equal to two of the spaces between said electrical marker signals whereby greater ease of adjustment of said indicating means is obtained.

19. The invention as defined in claim 12 wherein said marker signal generating means includes a controlled oscillator means for providing a plurality of oscillation signal cycles and pulse former means for forming pulses from said oscillation signal cycles as said electrical marker signals, and said varying means includes a vernier delay pulse generator responsive to said electrical reference signal to provide a pulse output signal of a predetermined duration, the end of said pulse output signal initiating generation of said plurality of electrical marker signals and said vernier delay pulse generator being adjustable to vary the duration of said pulse output signal whereby the occurrence of the beginning of said plurality of electrical marker signals can be varied relative to that of said electrical reference signal.

20. The invention as defined in claim 19 wherein said marker signal generating means further includes a frequency divider means connecting said oscillator means to said pulse former means, and said varying means can be adjusted to vary the occurrence of the beginning of said plurality of electrical marker signals over a duration at least equal to that between two successive electrical marker signals.

* * * * *